United States Patent [19]
Anderson

[11] 3,849,018
[45] Nov. 19, 1974

[54] MULTIPLE SPINDLE HEAD

[75] Inventor: Richard A. Anderson, Rockford, Ill.

[73] Assignee: Sundstrand Corporation, Rockford, Ill.

[22] Filed: Jan. 31, 1973

[21] Appl. No.: 328,323

[52] U.S. Cl. ................................................ 408/46
[51] Int. Cl. ........................................... B23b 39/16
[58] Field of Search ............ 408/46, 42, 47, 48, 236

[56] References Cited
UNITED STATES PATENTS

| | | | |
|---|---|---|---|
| 1,521,158 | 12/1924 | King | 408/42 |
| 2,293,991 | 8/1942 | Linderme | 408/236 X |
| 3,215,005 | 11/1965 | Miyakawa | 408/237 X |
| 3,652,175 | 3/1972 | Walters et al. | 408/46 |

FOREIGN PATENTS OR APPLICATIONS

| | | | |
|---|---|---|---|
| 908,330 | 4/1954 | Germany | 408/236 |

*Primary Examiner*—Andrew R. Juhasz
*Assistant Examiner*—Z. R. Bilinsky
*Attorney, Agent, or Firm*—Wegner, Stellman, McCord, Wiles & Wood

[57] ABSTRACT

A multiple spindle head usable with machine tools and particularly with the spindle of a numerically controlled machining center having automatic tool changing equipment wherein the head has a two-part body with one part of the body rotatably mounting a plurality of spindles which can be adjusted relative to each other for a preselected orientation and with a mounting stem rotatably mounted in the body and extending from the other body part to engage in the spindle of a machining center. Rotation of the spindle of the machining center rotates the mounting stem and the plurality of spindles. Locator means on the other body part rotatably orients the multiple spindle head to the machining center and holds the body against rotation during rotation of the plurality of spindles and means for varying the orientation of the plurality of spindles to the locator means including a rotatable mounting of one body part to the other about a central longitudinal axis and interfitting tapered rings one in each of said body parts for releasably locking the body parts against rotation.

2 Claims, 2 Drawing Figures

PATENTED NOV 19 1974 3,849,018

[3,849,018]

MULTIPLE SPINDLE HEAD

BACKGROUND OF THE INVENTION

This invention pertains to a multiple spindle head usable with machine tools and particularly with the spindle of a numerically controlled machining center whereby the orientation of the plurality of spindles relative to the machining center may be varied by a simple adjustment of a two-part body and particularly of one body part to the other whereby locator means on the body engageable with a part of the machining center may have its orientation to the plurality of spindles varied and the resulting orientation of the plurality of spindles to the machining center is varied.

In numerically controlled machining centers having automatic tool changers, it is normal to have all machining functions performed under numerical control without intervention of an operator. This requires a fixed repeatability of operation. Many machining operations are performed by a multiple spindle head which may carry drills or taps and which may also provide for adjustable orientation of the spindles relative to each other with the this latter adjustment being set up by an operator through use of a template. For repeatability, the orientation of the plurality of spindles must be the same in each use of the multiple spindle head and, therefore, it is necessary to have the multiple spindle head always locate in the spindle of the machining center in the same orientation which further requires a uniform and constant position of the multiple spindle head in the tool changing mechanism associated with the machining center.

One form of structure for accomplishing holding of a portion of a tool structure against rotation when in use and providing for oriented holding of the tooling by tool change mechanism is shown in Swanson et al U.S. Pat. No. 3,135,980. This prior patent did not relate to structure whereby a plurality of spindles could be arranged in varying dispositions relative to each other and rotationally oriented to the longitudinal axis of the multiple spindle head.

SUMMARY

A primary feature of the invention disclosed herein is to provide for adjustable orientation of a multiple spindle head relative to the spindle of a machining center to provide assured repeatability of operation of the multiple spindle head and to hold the body of the multiple spindle head stationary during operation.

A primary advantage of the invention disclosed herein is in the utilization of a two-part body for the multiple spindle head with one part mounting the plurality of spindles and with a rotatably mounted mounting stem extending from the other part of the body and with the other part having locator means for engagement with a part of the machining center to obtain orientation of the multiple spindle head and to hold the body stationary during operation and with releasable interlocking structure between the body parts which holds the body parts together and permits simple rotative adjustment of one body part to the other about a central longitudinal axis to vary the orientation of the plurality of spindles relative to said locator means.

An object of the invention is to provide a multiple spindle head which may have a plurality of spindles adjustably positioned relative to each other and with structure providing for rotatably orienting the plurality of spindles relative to locating structure which locates the multiple spindle head relative to the machining center including a two-part body for the multiple spindle head with the body parts releasably held against rotation by a pair of tapered rings and with one ring being movable whereby it can be released from the other ring to permit rotation of one body part to the other followed by retightening of the rings relative to each other to hold the body parts in fixed, interlocked relation.

DESCRIPTION OF THE PREFERRED EMBODIMENT

Figure 1:
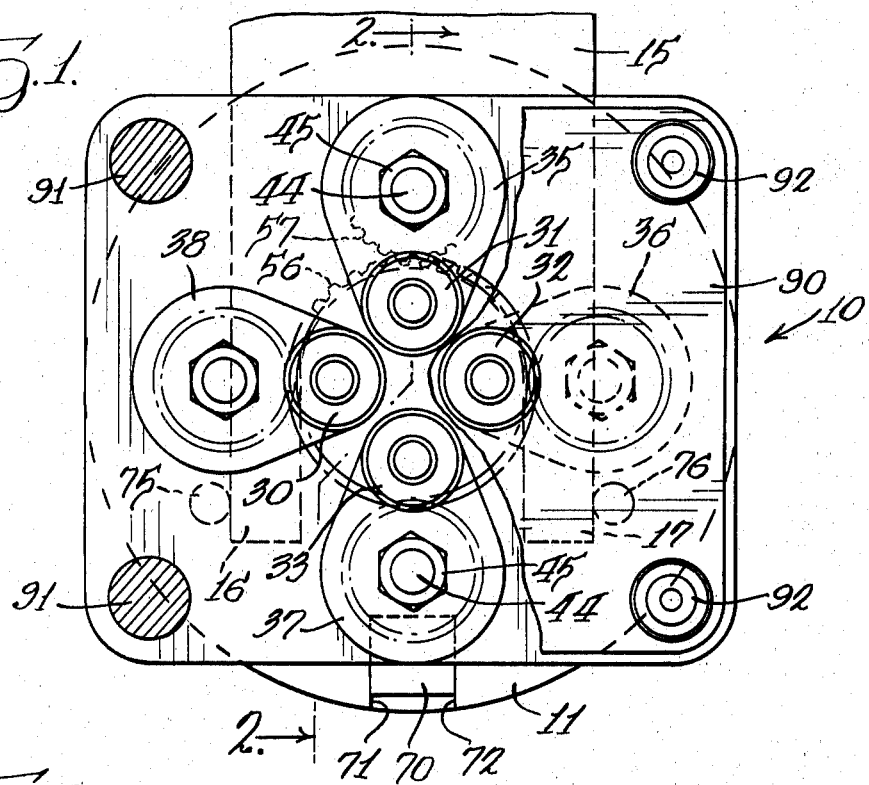
FIG. 1 is a front elevational view of the multiple spindle head shown in association with a part of the spindle head of a machining center and parts of an automatic tool changing structure associated with the machining center and with part of the template for positioning the plurality of spindles shown broken away.
Figure 2:
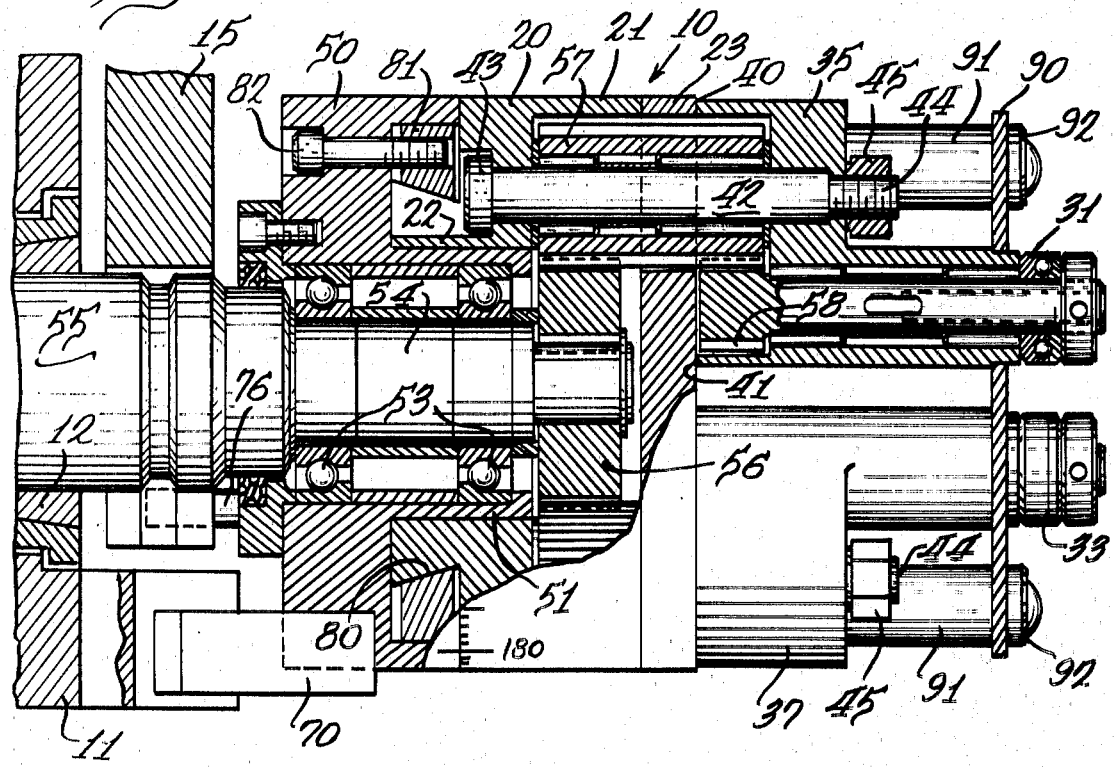
FIG. 2 is a vertical section, taken generally along the line 2—2 in FIG. 1 and with parts along a lower part of the section being shown in full line.

The multiple spindle head is shown generally at 10 and in association with a machining center wherein a spindle head 11 has a spindle 12 which is rotatably driven in a conventional manner during a machining operation. The machining center is a numerically controlled machine tool and, in most instances, has a tool change mechanism associated therewith. As shown in FIGS. 1 and 2, a tool change arm 15 has a bifurcated lower end with a pair of extensions 16 and 17 carrying tool gripping structure (not shown) and providing for abutment guide surfaces at the lower ends of the extensions 16 and 17 for a purpose to be described. The tool transfer arm 15 is normally withdrawn from the position shown in FIGS. 1 and 2 prior to commencing of a machining operation.

The multiple spindle head 10 has a two-part body with a first body part comprising a body part 20 having an outer peripheral flange 21 and an oppositely-extending flange 22. A plate 23 coacts with the body part 20 to form an outer face for the first body part and is secured thereto by attachment bolts (not shown). A plurality of spindles 30, 31, 32 and 33 extend outwardly from the face plate 23 and are each of a suitable construction to mount a drill or tap for rotation thereof by rotation of the spindle through structure to be described. Each of the spindles 30–33 is rotatably mounted in a carrier 35, 36, 37, 38 whereby the orientation of the plurality of spindles may be varied one to the other. Referring particularly to the holder 35 for the rotatable spindle 31, the holder movably abuts against the plate 23 at 40 and 41 and is rotationally adjustable about a pin 42 having a head 43 seated against a body part 20 and a threaded end 44 receiving a nut 45. Loosening of the nut 45 permits adjustment of the holder 35 about the pin 42 to obtain desired orientation of the spindle 31 and tightening of the nut 45 then holds the spindle 31 in the desired position.

The second body part 50 has a central annular section 51 which rotatably mounts the flange 22 of the first body part on the outer periphery thereof and internally provides a mounting for roller bearings 53.

The roller bearings 53 rotatably mount an inner end 54 of a mounting stem 55 which extends into the spindle 12 of the machining center and is gripped thereby whereby rotation of the spindle 12 rotates the mounting stem 55 to rotate a gear 56 carried by the inner end 54 of the mounting stem. This gear 56 rotatably drives all of the spindles 30–33, with the drive for spindle 31 being shown, in particular, in FIG. 2. The gear 56 engages a gear 57 rotatably mounted on the pin 42 by bearings, with a part of the gear 57 engaging a gear 58 on the inner end of the rotatable spindle 31. With the positioning of the spindles 30–33 being about their respective mounting pins, such as the mounting pin 42, and with the drive to each of the spindles being through a gear concentric with the mounting pin, it is seen that the drive connections to the spindles are maintained, regardless of the orientation thereof.

In order to hold the body of the multiple spindle head 10 stationary so that rotation of the spindle 12 will cause rotation of the spindles 30–33, locator means are provided on the second body part 50 in the form of a key 70 which engages in a notch having side walls 71 and 72 on a part of the machining center, such as the stationary spindle head 11. This interengagement holds the body of the multiple spindle head stationary during operation and also provides a predetermined orientation of the spindles 30–33 to the spindle 12 of the machining center. In order to have the multiple spindle head brought to the machining center with the locator means 70 properly oriented, the guide surfaces at the lower ends of extensions 16 and 17 of the tool transfer arm 15 engage a pair of pins 75 and 76 extending outwardly from the second body part 50. In order to variably orient the spindles 30–33 rotatably relative to the machining center, a structure is provided, as shown particularly in FIG. 2. The body part 20 has the flange 22 thereof formed with a tapered ring 80 which is continuous except for gaps to permit assembly of the pins 42 and particularly location of the headed ends 43 thereof. The tapered ring 80 coacts with a tapered split ring 81. The tapered split ring 81 is carried by the second body part 50 and positioned to have the wedging surfaces of the rings in engagement. The tapered split ring 81 is movably carried by the second body part 50 by mounting on a plurality of threaded bolts 82 which are operable from an exposed end of the body whereby upon rotation of the bolts in one direction the split ring 81 can be released from clamping engagement with tapered ring 80 to permit rotation of the first body part and spindles 30–33 relative to the second body part and to the locator means 70 carried thereby. Tightening of the bolts 82 then holds the body parts in fixed interlocked relation.

The adjustment of the spindles 30–33 has been described. To facilitate desired location thereof, a template 90 is removably mounted on a plurality of mounting posts 91 extending outwardly from the second body part 50 and with the template having openings to receive the plurality of spindles 30–33 in a desired orientation. The template 90 can be held on the posts by suitable attachment members 92. The template 90 does not interfere with operation of the nuts 45 associated with the mounting pins 42 which, as shown for the nut 45 in the lower right-hand part of FIG. 2, can easily be engaged by a wrench.

With the structure disclosed herein, a plurality of spindles 30–33 can be adjusted in their orientation one with respect to the other by use of a locating template 90 and by operation of the nuts 45 associated with the mounting pins 42 to position the holders 35–38. The orientation of the adjusted plurality of spindles may then be set in a desired relation to the spindle of the machining center by a rotatable orientation of the first and second body parts to have the locator means 70 in a proper rotatable orientation to the plurality of spindles 30–33.

With the structure disclosed herein, the parts of the multiple spindle head which must maintain a uniform relation with the machining center may do so while the multiple spindles can have the desired orientation to a workpiece that is being machined, with this result being simply obtained by the interfitting adjustable relation between the first and second body parts, with the multiple spindles carried on the first body part and the structure associated with the machining center carried on the second body part.

I claim:

1. A multiple spindle head for use in numerical control machining centers comprising, an interlocked two-part body, one of said body parts rotatably mounting a plurality of spindles, a mounting stem rotatably mounted in said body and extending from the other body part for insertion into the spindle of said machining center, means within said body for transmitting rotation of the mounting stem to said plurality of spindles, locator means on the other body part engageable with the spindle head of the machining center to orient said body and hold said body against rotation, means for rotatably adjusting said body parts relative to each other about an axis lengthwise of said body to vary the orientation of the plurality of spindles to said locator means, said plurality of spindles being adjustably mounted on said one body part to vary their orientation one to the other, a template for locating each of said plurality of spindles in a selected position, and mounting posts for said template extending outwardly from said other body part.

2. A multiple spindle head usable with machine tools and particularly with the spindle of a numerically controlled machining center comprising, a two-part body with a first body part mounting a plurality of spindles for rotation, means individually mounting each of said plurality of spindles to said first body part for variable positioning as required in a machining operation, a mounting stem rotatably mounted in said body and rotationally connected to said plurality of spindles and extending outwardly of the second body part for driving engagement with the spindle of the machining center, locator means on said second body part engageable with a stationary part of the machining center to rotatably orient the body and hold the body against rotation, and means for varying the orientation of said plurality of spindles to said locator means including a rotatable mounting of one body part to the other for rotation about a central longitudinal axis, and interfitting tapered rings one on each of said body parts for releasably locking said body parts against rotation, one of said interfitting rings being split and means for moving said split ring away from the other ring to permit rotatable adjustment of one body part to the other.

* * * * *